(12) United States Patent
Kienitz et al.

(10) Patent No.: US 11,243,224 B2
(45) Date of Patent: Feb. 8, 2022

(54) FIBER-OPTIC ACCELERATION SENSOR HAVING LEVER ARM

(71) Applicant: FOS4X GMBH, Munich (DE)

(72) Inventors: Sascha Kienitz, Munich (DE); Markus Schmid, Munich (DE); Manuel Mai, Munich (DE)

(73) Assignee: FOS4X GMBH, Munich (DE)

( * ) Notice: Subject to any disclaimer, the term of this patent is extended or adjusted under 35 U.S.C. 154(b) by 192 days.

(21) Appl. No.: 16/472,199

(22) PCT Filed: Dec. 22, 2017

(86) PCT No.: PCT/EP2017/084487
§ 371 (c)(1),
(2) Date: Jun. 21, 2019

(87) PCT Pub. No.: WO2018/115486
PCT Pub. Date: Jun. 28, 2018

(65) Prior Publication Data
US 2020/0233008 A1    Jul. 23, 2020

(30) Foreign Application Priority Data

Dec. 23, 2016 (DE) ............ 10 2016 125 612.9

(51) Int. Cl.
*G01P 15/093* (2006.01)
*G01H 9/00* (2006.01)
(Continued)

(52) U.S. Cl.
CPC .......... *G01P 15/093* (2013.01); *G01H 9/004* (2013.01); *G01P 1/006* (2013.01); *G01P 15/18* (2013.01); *G01P 2015/0828* (2013.01)

(58) Field of Classification Search
CPC ........ G01P 15/093; G01P 1/006; G01P 15/18; G01P 2015/0828; G01P 15/03; G01H 9/004; G01H 9/006
(Continued)

(56) References Cited

U.S. PATENT DOCUMENTS

2004/0237648 A1    12/2004  Jones et al.
2018/0156643 A1*    6/2018  Knoppers ............. G01P 15/093

FOREIGN PATENT DOCUMENTS

CN          2784933 Y        5/2006
CN        101285847 A       10/2008
(Continued)

OTHER PUBLICATIONS

Torben Storgaard-Larsen O, Siebe Bouwstra N, Otto Leistiko H, Opto-mechanical accelerometer based on strain sensing by a Bragg grating in a Planar waveguide, Sensors and Actuators, A52 (1996) A Physical•Elsevier, vol. 52, Issues 1-3, Mar. 1, 1996, pp. 25-32 Denmark.

(Continued)

*Primary Examiner* — Robert R Raevis
(74) *Attorney, Agent, or Firm* — Moser Taboada

(57) ABSTRACT

The invention relates to a device for detecting acceleration. The device contains: a frame; a mass; a lever arm connected to the mass, wherein the mass is provided at a first lever position; an optical fiber having a fiber-optic sensor; and a compensation element for disturbance variables, wherein the compensation element for disturbance variables is connected to the lever arm or the mass and wherein the compensation element for disturbance variables is connected to the frame.

14 Claims, 5 Drawing Sheets

(51) Int. Cl.
*G01P 1/00* (2006.01)
*G01P 15/18* (2013.01)
*G01P 15/08* (2006.01)

(58) Field of Classification Search
USPC ... 73/514.26, 652–654, 510, 514.02, 514.14, 73/514.16, 514.27, 705
See application file for complete search history.

(56) References Cited

FOREIGN PATENT DOCUMENTS

| | | |
|---|---|---|
| CN | 102128952 A | 7/2011 |
| CN | 202093044 U | 12/2011 |
| DE | 19939583 A1 | 9/2000 |
| DE | 102013101432 A1 | 8/2014 |
| WO | WO 99 39214 | 8/1999 |
| WO | WO-2010/057247 A1 | 5/2010 |
| WO | WO-2015/127814 A1 | 9/2015 |

OTHER PUBLICATIONS

International Search Report and Written Opinion for application No. PCT/EP2017/084487, dated Apr. 16, 2018.

\* cited by examiner

US 11,243,224 B2

FIBER-OPTIC ACCELERATION SENSOR HAVING LEVER ARM

TECHNICAL FIELD

Embodiments of the present application generally concern an optical measurement device for detecting measurement variables by means of sensors embedded in optical fibers, and concerns in particular a measurement device and a method for measuring an acceleration by fiber-optic measurement systems. Specifically, embodiments relate to a device for detecting acceleration, a device for detecting acceleration in at least two spatial directions, and a method for detecting acceleration.

STATE OF THE ART

Fiber-optic sensors are increasingly gaining importance in highly precise measurement systems. In this case, one or more sensors embedded in fiber optic cables, such as fiber Bragg gratings, for example, are used to detect elongations of the optical fiber caused by mechanical variables, and to be able to thus detect the forces, torques, loads, etc.

The sensor elements integrated in fiber sensors are radiated with optical radiation in a suitable wavelength range, wherein, depending on the configuration of the sensor element and the mechanical variable acting upon the sensor element, a part of the irradiated light is reflected and/or transmitted by the sensor and can be guided to an evaluation and analysis unit. Due to the acting force, the fiber optic cable is elongated, and a reflection or transmission wavelength of the fiber Bragg grating changes. This change in wavelength can be examined in the analysis unit and used for detecting mechanical influenced acting upon the sensor element.

The intensity and/or the wavelength range of the optical radiation reflected at the sensor element or of the optical radiation transmitted by the sensor element now exhibit features that are influenced by the applied mechanical variable. The fiber optic sensor elements integrated into the optical sensor fiber inter alia are sensitive to elongations of the sensor fiber, whereby the wavelength spectrum reflected by the sensor element or transmitted by the sensor element is influenced.

Further, the detection of accelerations is important for a number of applications in the measurement and control technology. In this case, a simple and yet precise manufacture of corresponding optical measurement systems is desirable. Typically, fiber-optic acceleration sensors are created by linking an optical fiber to a mass. In this case, it should also be considered among other things that different sensitivities or measurement ranges are provided for different measuring tasks.

Furthermore, it should be considered that elongations of the optical fiber, and thus of the optical sensor element in the fiber and/or changes to the fiber Bragg grating structure, do not only depend on the mechanical variable to be measured, such as the force, for example, but are also influenced by undesired disturbance variables such as temperature fluctuations, for example. It is thus desirable to eliminate or at least reduce disturbance variables having an effect on the measuring accuracy in detecting the target variable.

SUMMARY OF THE INVENTION

The present invention provides a device for detecting acceleration, a device for detecting acceleration in at least two spatial directions, and a method for detecting acceleration. Preferred embodiments and particular aspects of embodiments of the invention will result from the dependent claims.

According to an embodiment, a device for detecting acceleration is provided. The device includes a frame; a mass; a lever arm connected to the mass, wherein the mass is provided at a first lever position; an optical fiber having a fiber-optic sensor; and a compensation element for disturbance variables, wherein the compensation element for disturbance variables is connected to the lever arm or the mass, and wherein the compensation element for disturbance variables is connected to the frame.

According to a further embodiment, a device for detecting acceleration in at least two spatial directions is provided. The device includes at least two devices for detecting acceleration in one spatial direction, wherein the respective frames of the at least two devices are mutually connected.

According to a further embodiment, a method for detecting acceleration is provided. The method includes irradiating electromagnetic radiation into a device of one of the embodiments of the present disclosure; detecting an optical signal provided by the electromagnetic radiation influenced by the device; and evaluating the optical signal.

BRIEF DESCRIPTION OF DRAWINGS

Exemplary embodiments are illustrated in the drawings and explained in greater detail in the following description. Shown are in the drawings.

In the drawings, identical reference numerals designate identical or functionally identical components or steps.

DETAILED DESCRIPTION OF EXEMPLARY EMBODIMENTS

Figure 1:
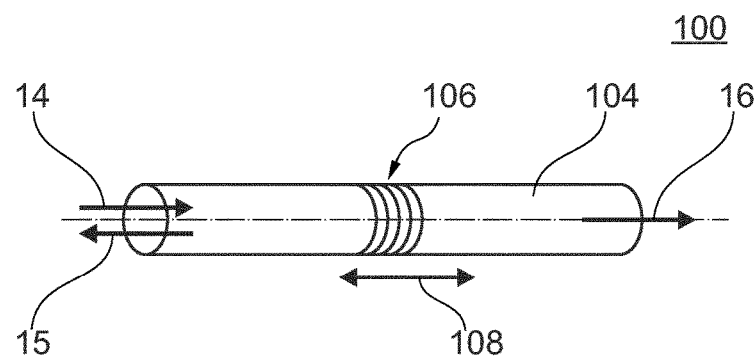
FIG. 1 a sensor fiber including an integrated sensor element formed as a fiber Bragg grating, for measuring fiber elongation.

Hereinafter, detailed reference will be made to various embodiments of the invention, with one or more examples being illustrated in the drawings.

Embodiments of the present invention described herein relate inter alia to a device and a method for detecting acceleration by means of a fiber-optic measurement system. In the device, for example, a fiber-optic measurement system, at least one fiber Bragg grating is provided, for example, which has a Bragg wavelength. The fiber Bragg grating is irradiated with primary light and is acted upon with a mechanical variable in such a manner that the Bragg wavelength of the fiber Bragg grating is changed by the mechanical variable.

After detecting the secondary light caused by the primary light and modified by the Bragg wavelength of the fiber Bragg grating in dependence of the mechanical variable, the optical signal is evaluated. The mechanical variable typically is an elongation of an optical fiber, which is attached to a lever arm and a further position in such a manner that a force exerted on the lever arm induces an elongation (positively or negatively) of the optical fiber. The force exerted on the lever arm is due to an acceleration of a mass which is likewise attached to the lever arm. The use of a lever arm and the cooperation effects between lever arm, optical fiber, mass and a mount or a housing, or a frame, respectively, allow a sensitivity of the sensor to be defined, a measurement range of the sensor to be defined, and/or a disturbance signal caused by temperature to be reduced or suppressed.

According to embodiments of the present invention, there is a correlation between frame, lever arm, optical fiber and mass. This correlation can in particular influence an impairment of the measurement by disturbance variables, for example, temperature fluctuations. For compensating the disturbance variables, for example, for compensating temperature, decoupling the elements can be advantageous. Embodiments of the present invention include a compensation element for compensating disturbance variables, for example, for temperature compensation. The compensation element may be provided as a fiber mount provided separately from the lever arm. In addition, or as an alternative, a further compensation element may be provided as a damping element.

FIG. 1 illustrates a sensor or a sensor unit 100 integrated into an optical fiber and having a fiber Bragg grating 106. Although only a single fiber Bragg grating 106 is shown in FIG. 1, it should be understood that the present invention is not restricted to a data acquisition from a single fiber Bragg grating 106, but that a plurality of fiber Bragg gratings 106 can be arranged along a transmission fiber, a sensor fiber or an optical fiber 104.

FIG. 1 thus only shows a section of an optical waveguide formed as a sensor fiber or optical fiber 104, wherein this sensor fiber is sensitive to fiber elongation (see arrow 108). It should be noted at this point that the term "optical" or "light" should be indicative of a wavelength range in the electromagnetic spectrum, which can extend from the ultraviolet spectral range via the visible spectral range up to the infrared spectral range. An average wavelength of the fiber Bragg grating 106, i.e. a so-called Bragg wavelength $\lambda_B$, is obtained by the following equation:

$$\lambda_B = 2 \cdot n_k \cdot \Lambda.$$

In this case, $n_k$ is the effective refractive index of the basic mode of the core of the optical fiber 104, and $\Lambda$ is the spatial grating period (modulation period) of the fiber Bragg grating 106.

A spectral width given by the peak width at half height of the reflection response depends on the elongation of the fiber Bragg grating 106 along the sensor fiber. Due to the action of the fiber Bragg grating 106, the light propagation within the sensor fiber is thus dependent, for example, on forces, moments and mechanical tensions as well as temperatures, which act upon the sensor fiber, i.e. the optical fiber 104 and in particular the fiber Bragg grating 106 within the sensor fiber.

As shown in FIG. 1, electromagnetic radiation 14 or primary light enters the optical fiber 104 from the left, wherein a part of the electromagnetic radiation 14 exits as transmitted light 16 at a changed wavelength progress as compared to the electromagnetic radiation 14. Further, it is possible for reflected light 15 to be received at the input end of the fiber (i.e. at the end where the electromagnetic radiation 14 is also radiated in), wherein the reflected light 15 likewise has a modified wavelength distribution. The optical signal used for the detection and evaluation can be provided according to the embodiments described herein by the reflected light, by the transmitted light and also a combination of both of them.

In a case, where the electromagnetic radiation 14 or the primary light is irradiated in a wide spectral range, a transmission minimum results in the transmitted light 16 in place of the Bragg wavelength. A reflection maximum results here in the reflected light. A detection and evaluation of intensities of the transmission minimum and the reflection maximum, respectively, or of intensities in corresponding wavelength ranges generate a signal, which can be evaluated with respect to the change of length of the optical fiber 104, and thus is indicative of the forces or accelerations.

Figure 2:
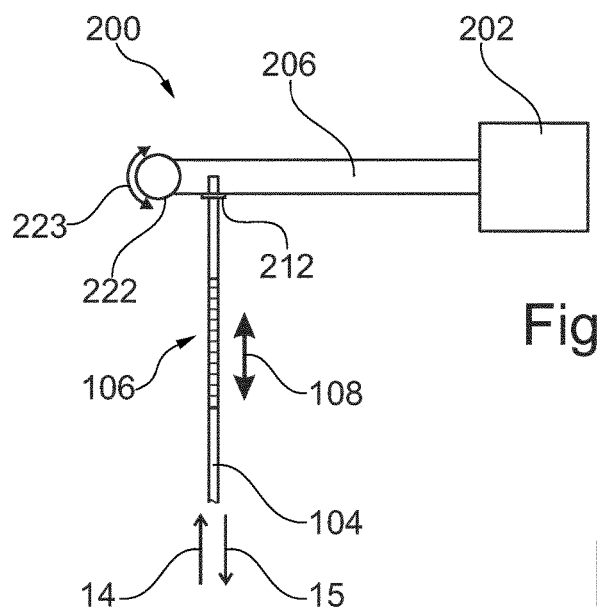
FIG. 2 a schematic view of a device for measuring acceleration having a lever arm, and an embodiment of the invention.

FIG. 2 shows a device 200 for detecting acceleration. The device includes a mass 202 which is attached to a lever arm 206. The lever arm 206 has a fixed point 222 so that a movement of the lever arm and the mass, which is illustrated by arrow 223, is enabled. Moreover, an optical fiber 104 having a fiber Bragg grating 106 is attached to the lever arm 206. In this case, the sensor fiber is attached to the lever arm 206 by a fastening element 212. According to typical embodiments, the fastening element may be an adhesive joint or a clamping device. The mass 202 is connected to the lever arm 206 at a first lever position, and the optical fiber 104 is connected to the lever arm 206 at a second lever position. A movement of the mass or the lever arm, which is shown by arrow 223, leads to a change of length of the optical fiber 104, which is shown by arrow 108, and to a force action upon the optical fiber 104, respectively. Hereby, the fiber Bragg grating 106 generates a changed wavelength progress of the optical signal, such as of the reflected light 15 produced by the reflection of the primary light or the electromagnetic radiation 14, which changed wavelength progress depends on the elongation or change of length.

In conventional acceleration sensors, the mass is typically restricted in one or more spatial directions in the configuration by a spring mechanism. In the simplest case, the mass can only move in one direction. In this direction, a sensor fiber is attached to the mass, which stretches upon a movement of the mass. In such an arrangement, the maximum elongation and thus the sensitivity of the fiber are given by the weight of the mass and the rigidity of the fiber. In this case, merely the mass can be enlarged to enhance the sensitivity of such a sensor. For sensitive sensors, this can lead to masses of up to several 100 g of weight. A further disadvantage of such an arrangement is that in this case the resonance frequency f of the system of fiber and mass has a dependency f~root(k/m), which consequently decreases with an increasing mass. In this case, k is the spring stiffness of the system of fiber and mass. Since the minimum spring stiffness is limited by the rigidity of the fiber, only a restricted area can thus be configured.

By using a lever arm, this limitation of the area to be configured can be cancelled or reduced. As is explained in more detail in FIG. 4 but can be recognized also already in FIG. 2, a change of the attachment position of the optical fiber 104 along the lever arm 206, i.e. a change of the second lever position where the optical fiber 104 is attached, allows a change of the sensitivity of the device for detecting acceleration to be provided. The sensitivity can thus be changed without changing the mass 202 for this effect and thus influencing the resonance frequency.

Embodiments of the present invention thus allow the correlation between rigidity of the fiber, sensitivity, and resonance frequency to be broken. By the use of a mechanical lever, the relationship of the deflection of the fiber and the necessary force becomes arbitrarily configurable. Further, the use of a lever arm allows an increased force on the fiber even with a smaller mass or a constant mass.

The movement represented by arrow 223 is a movement of the lever arm 206 or the mass 202 in the paper plane of FIG. 2. Typically, the fixed point 222 may be designed such that a movement is performed only in one plane. According to further embodiments, however, a movement may also be performed in two planes or even in three planes. In such an embodiment having a plurality of movement planes, further optical fibers 104 each having a fiber Bragg grating 106 can be connected to the lever arm 206 so that a detection of acceleration can be performed in several spatial directions. According to typical embodiments, a device for multi-dimensionally detecting acceleration, however, is realized as described with respect to FIG. 7.

Figure 3A:
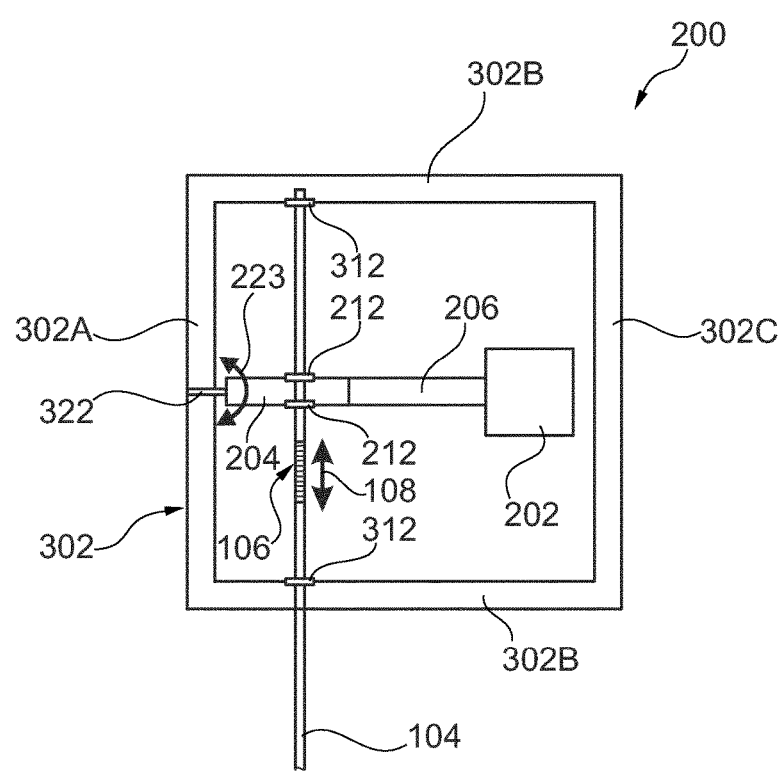
FIG. 3A a schematic view of a further device for measuring acceleration having a lever arm and an optical fiber connected thereto, as well as a mount, for example, in the form of a frame, according to an embodiment of the invention.

FIG. 3A shows a further embodiment of a device 200 for detecting acceleration. In analogy to FIG. 2, a mass 202 is connected to the lever arm 206 at a first lever arm position. An optical fiber 104 having a fiber Bragg grating 106 is connected to a fiber mount, wherein the fiber mount 204 is connected to the lever arm 206, so that a movement of the mass 202, the lever arm 206, and the fiber mount 204, which movement is illustrated by arrow 223, leads to a change of length of the optical fiber as illustrated by arrow 108. According to some embodiments, which can be combined with other embodiments, a rotary point of the lever arm 206 and thus of the fiber mount 204 can be provided by a spring 322. The mechanical spring, for example, may be a sheet metal, i.e. a thin sheet metal, extending perpendicular to the paper plane in FIG. 3A. This enables a free rotation of the fiber mount or the beam or lever arm. By the use of a spring 322 such as a leaf spring, for example, the free rotation is restricted to the rotational direction in the sensor plane. A corresponding fixed point is typically inside the spring 322 and is predefined by the characteristics of the spring or the attachment of the spring. The spring 322 is clamped in a mount 302 or attached to the mount 302.

According to typical embodiments, the mount may be designed as a frame. In this case, the frame may have a first front surface 302A to which the spring 322 is attached or into which the spring 322 is clamped. In the event of clamping the spring, the front surface 302A may be of a two-part design. Further, the frame may have front surfaces 302B adjacent to the first front surface 302A. A further front surface 302C may impart sufficient stability to the frame but is not necessarily required for embodiments of the present invention. This applies in particular when the front surfaces 302A and 302B have sufficient rigidity.

The optical fiber 104 is connected to the mount, for example, the front surface 302B, by fastening elements 312. The fastening elements 312 may be provided by an adhesive point or a clamping device. Moreover, the optical fiber 104 is connected to the lever arm 206 by at least one fastening element 212, with two fastening elements 212, e.g. two adhesive points, being represented in FIG. 3A. According to typical embodiments, which can be combined with other embodiments described herein, the fiber is pretensioned prior to being connected to the mount 302 or the lever arm 206 by the fastening elements 212 or 312. In this case, the fiber is pretensioned between the lower front side 302B in FIG. 3A and the lever arm 206, and pretensioned between the upper front side 302B and the lever arm 206. The pretension performs a stabilization of the position of the lever arm 206 and mass 202, respectively. Further, an arbitrary elongation, i.e. a positive elongation (stretching) and a negative elongation (compression), may be used without the risk of buckling the optical fiber 104.

According to typical embodiments, which can be combined with other embodiments, the devices for detecting acceleration include a mechanical spring enabling the free rotation of a lever arm or beam around a fixed point, a lever arm or beam, a mass, and a frame and a fiber having a fiber Bragg grating (FBG). Further, a fiber mount and/or a damping element may be provided for temperature compensation or compensation of other disturbance variables. A spring may serve as the fixed point of the beam or the lever arm.

Due to the use of a thin metal sheet as the spring element, for example, the movement of the beam is restricted to the rotational direction of the sensor plane. A movement perpendicular thereto is limited by the considerably higher rigidity of the metal sheet. This also enables the measurement in a transverse position. The optical fiber, i.e. the measurement fiber, is pretensioned in the frame and connected, e.g. adhered to the beam. Upon acceleration of the mass, a force is introduced via the lever, or the lever and the fiber mount, into the fiber, which force is intensified by the lever factor, or the lever factor of the lever and the fiber mount. This leads to an elongation in the measurement fiber, which is proportional to the acceleration. By setting the lever length, the sensitivity and the resonance frequency can be set. Embodiments of the invention allow a reliable acceleration sensor to be implemented, which enables a simple and yet precise manufacture and even a precise manual manufacture.

Typical embodiments of the present invention permit a furthermore advantageous design. Due to changes of the ambient temperature, the extension of the mount 302 or of the frame forming the mount, as shown by way of example in FIG. 3A, changes. This may result in changes of length in the optical fiber 104, which is not induced by an acceleration of the mass 202. Therefore, according to typical embodiments, which can be combined with other embodiments described herein, the material of the frame or the material of the fiber mount is selected as follows.

The mount 302 or the frame having the front surfaces 302A and 302C has a predetermined dimension at a given temperature in the direction of the axis of the optical fiber 104. Further, the fiber mount 204 has a predetermined dimension in the direction of the axis of the optical fiber 104. Due to the different dimensions in this direction, a change in temperature leads to a different thermal expansion with identical thermal expansion coefficients. Therefore, according to typical embodiments, which can be combined with other embodiments described herein, the material of the mount 302 is selected so as to have a lower thermal expansion coefficient as compared to the material of the fiber mount.

The mount 302, for example, may be provided having a thermal expansion coefficient of 5 ppm/K to 27 ppm/K, e.g. 23 ppm/K. The fiber mount 204 may be provided having a thermal expansion coefficient of at least 30 ppm/K, for example, 30 ppm/K to 100 ppm/K, for example, 50 ppm/K. For example, the fiber mount may be made of polyetherimide (PEI). The mass and/or potentially the lever arm may be provided as a seismic mass made of another material (as compared to the fiber mount), for example of iron, steel or other materials, with the density according to some embodiments being more than 5 g/cm$^3$.

Moreover, it is advantageous in this context for the dimension of the fiber mount in the direction of the longitudinal axis of the optical fiber 104 to have at least 20% or at least 40% of the dimension of the mount 302 in the corresponding direction. In selecting the dimensions of the fiber mount in the direction of the longitudinal axis of the fiber, and in selecting the thermal expansion coefficient, attention should be further paid whether the fastening elements 312 or 212, by which the optical fiber 104 is connected, are mounted to the respective inner side or the respective outer side of the mount or to the upper or lower side of the fiber mount. A corresponding adaptation allows in this case the selection of the materials and dimensions to be provided accordingly.

According to further embodiments, which can be combined with other embodiments described herein, the thickness of the fiber mount is at least 6 mm, for example, approximately 10 mm. The thickness of the beam is the expansion essentially parallel to the direction of the longitudinal axis of the optical fiber 104. The combination of an expansion coefficient of 30 ppm/K and greater and a dimension (thickness) described herein of the lever arm has the advantage of improved temperature compensation. Moreover, it is possible according to some embodiments of the present invention for the lever arm and the fiber mount to be provided independently of one another. The fiber mount can be adjusted to the thermal expansion of the mount 302. The lever arm having a mass, or the lever arm having an additional mass, may be selected independently of the selection of the fiber mount for a sensitivity of the sensor.

The selection of materials having corresponding thermal expansion coefficients allows the influence of temperature changes to be significantly reduced or eliminated. For example, an elongation of the fiber can be reduced to a few pm/Kelvin or below 1% of the gravitational force.

Figure 3B:
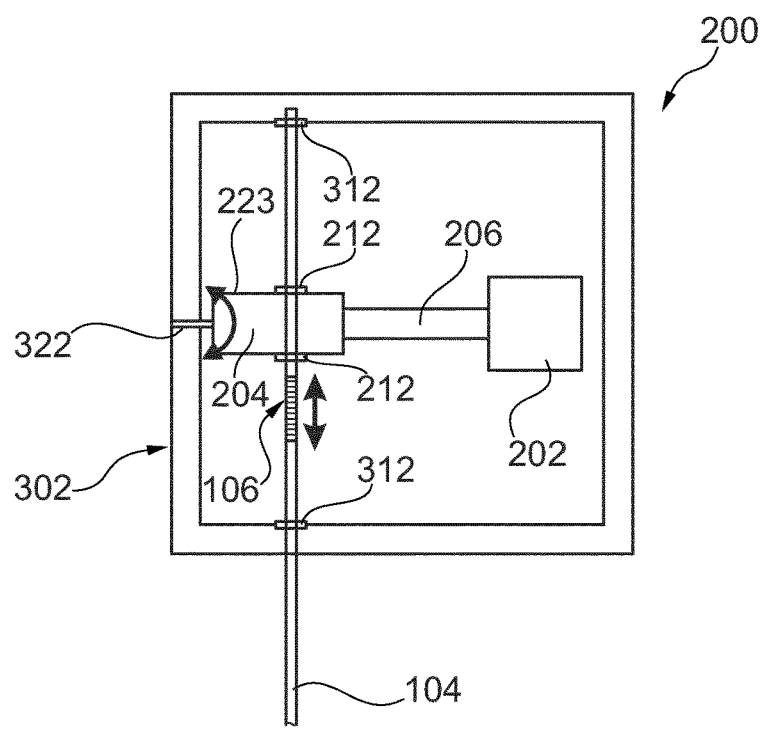
FIGS. 3B and 3C further schematic views of further devices for measuring acceleration having a lever arm and an optical fiber, as well as a mount, for example, in the form of a frame, according to an embodiment of the invention.

FIG. 3B shows a further embodiment of a device 200 for detecting an acceleration. The optical fiber 104 is clamped in a frame 302. For measuring the deflection of the mass 202, a fiber Bragg grating 106 is provided. Further, the optical fiber 104 is connected to the fiber mount 204. The fiber mount 204 is connected to the frame 302. Moreover, the fiber mount 204 is connected to the lever arm 206. The lever arm 206 is connected to the mass 202, for example, a seismic mass, for measuring acceleration. According to some embodiments described herein, which can be combined with other embodiments, the fiber mount 204, the lever arm 206, and the mass 202 form a lever or a movable arrangement, wherein the acceleration of the mass 202, or the acceleration of the mass 202 and the lever arm 206, lead to an elongation or compression of the fiber 104. In FIG. 3B, the fiber mount 204 is thicker than the lever arm 206. According to further embodiments, the fiber mount may also be thinner than the lever arm 206 (see FIG. 3C, for example). Due to the separation of fiber mount and lever arm, the fiber mount may be designed as a compensation element independent of the lever arm.

The separation of fiber mount 204 and lever arm 206 allows the parameters for the compensation of disturbance variables, for example, the temperature compensation, and the parameters for the sensor sensitivity, for example, the length of the lever arm, to be set independent of one another. This allows improved temperature compensation. An improved temperature compensation furthermore results in an easier setting of the working point in the production of the device. The improved temperature compensation, for example, leads to a reduced displacement of the Bragg wavelength when the sensor is heated for curing adhesive substances.

Furthermore, according to some of the embodiments described herein, the temperature sensitivity can be provided by the height (dimension in the direction of the sensor fiber) of the fiber mount. This may be performed essentially independent of the lever arm, so that an interaction between parameters of the compensation of disturbance variables and parameters of the sensitivity of the sensor is reduced. In this respect, a sensor mount may be designed such that the sensor mount forms a lever with a ratio of approximately 1:1, so that the design of the fiber mount has no influence on the lever ratio.

Figure 3C:
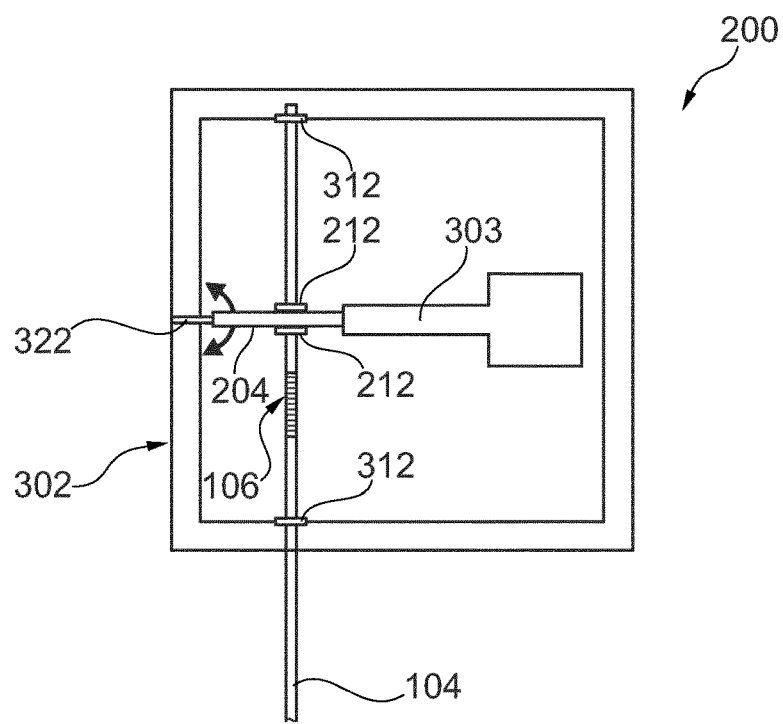

FIG. 3C shows a further embodiment, which can be combined with further embodiments. In contrast to FIG. 3B, the device 200 for detecting acceleration includes a fiber mount 204, and a lever arm integrally formed with the mass 303. The combination of mass and lever arm may result in an easier production of the device 200. A separation of sensor mount and lever arm may in particular be defined in that the sensor mount as such forms a lever with a ratio between 0.8:1 and 1:0.8, hence approximately a lever with the ratio 1:1.

Moreover, FIG. 3C shows an optional design of the embodiment described herein, wherein the optical fiber is merely provided in one direction between the frame 302 and the movable assembly or the movable arrangement, for example, between the fiber mount 204 and the lever arm integrally formed with the mass 303. This may be advantageous in particular in combination with a damping element as will be described in more detail with respect to FIGS. 6A and 6B. This allows the number of contact points to be reduced by which the mass is connected to the frame 302 directly or indirectly. Hereby, tensions can be reduced.

Figure 4:
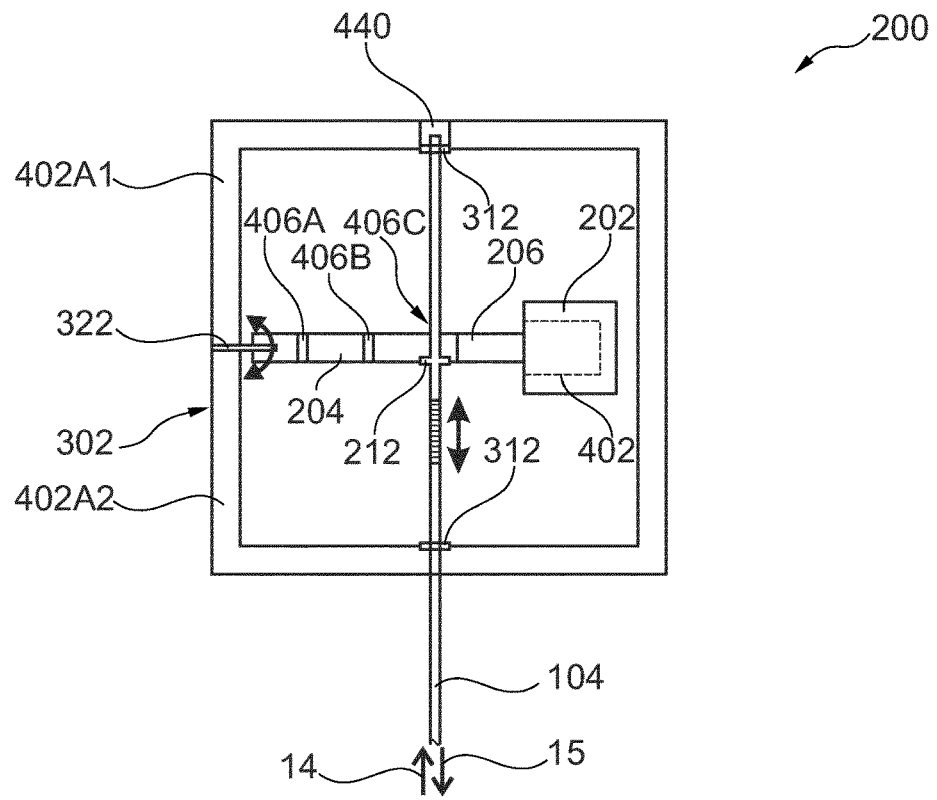
FIG. 4 a schematic view of a further device for measuring acceleration having a lever arm and an optical fiber connected thereto, according to an embodiment of the invention, wherein the setting of a measurement range and/or a sensitivity will be described according to embodiments of the present invention.

FIG. 4 shows a further device 200 for detecting acceleration. FIG. 4 shows a mass 202 attached to a lever arm 206. The lever arm 206 illustrated in FIG. 4 is connected to a fiber mount 204 which has a plurality of openings 406A, 406B and 406C, through which the optical fiber 104 is guided. In the case of a fiber mount having several openings, the fiber mount may likewise provide a part of the lever arm. The optical fiber is connected to the fiber mount 204 by a fastening element 112, such as, for example, an adhesive joint, after having been guided through the opening in the lever arm. Moreover, the optical fiber 104 is attached to the mount 302 by a fastening element 312 such as, for example, an adhesive joint.

FIG. 4 moreover shows a terminator 440 provided at the end of the optical fiber 104. The terminator 440 leads to a damping of the reflection at the fiber end of the optical fiber. This allows a reflection at the fiber end adversely affecting the optical signal to be reduced. Apart from the refection of the primary light or the electromagnetic radiation 14 at the fiber Bragg grating of the optical fiber 104, which leads to a change of spectral lines of the optical signal, such as, for example, the reflected light 15, a reflection at the fiber end may also be superimposed on the measurement signal or optical signal. A terminator 440 allows such a superimposition with the reflection signals, which superimposition represents a disturbance signal, to be reduced or prevented. A terminator may also be used in other embodiments described herein.

FIG. 4 further serves for illustrating embodiments for producing devices 200 for detecting acceleration and for defining the sensitivity and the measurement range of the acceleration sensor, respectively. According to typical embodiments, which can be combined with other embodiments, the front side of the frame, which forms the mount 302, can be of a two-part design. The spring 322 is clamped between a first part 402A1 and a second part 402A2 of the front side. By selecting the thickness of the spring 322 or by lining the spring 322 with additional metal sheets between the respective parts of the front surfaces and the spring 322, the pretension of the optical fiber 104 may be set even after the adhering process by the fastening elements 312. This allows the pretension of the optical fiber 104 to be regulated or changed in a simple manner.

Moreover, there exist at least two options for selecting the sensitivity or the measurement range. On the one hand, a smaller mass 402 may be used instead of the mass 202. On the other, the optical fiber 104 may be guided through an arbitrary one of the openings 406A, 406B or 406C. Hereby, the attachment position is changed relative to the lever arm 206, this means a second lever arm position of the fiber. At a constant first lever arm position, at which the mass is attached to the lever arm 206 (and a constant fixed point of the lever arm), the lever action for the force exerted on the optical fiber can be set by selecting the second lever arm position.

In a typical embodiment of the production or adaptation of a device for detecting acceleration according to embodiments described herein, the mass is first changed in the context of defining an area or defining sensitivity. For this purpose, a 3-part design of the arrangement of fiber mount, lever arm and mass may in particular be convenient. If a corresponding change is not sufficient or results in a mass which is too small or too large, a change of the second lever arm position may be performed in addition. This may be done, for example, by selecting the corresponding opening of the fiber mount 204. According to alternative embodiments, an oblong opening may be used in the fiber mount instead of a plurality of openings so hat a continuous displacement of the second lever arm position is enabled.

Figure 5:
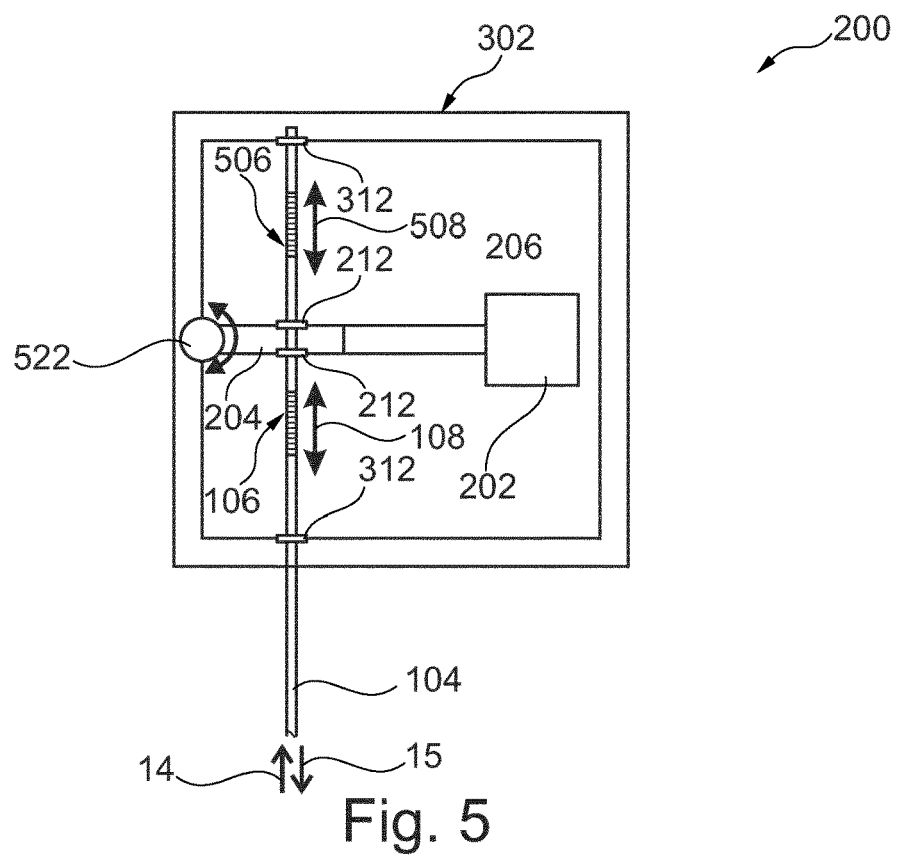
FIG. 5 a schematic view of a further device for measuring acceleration having a lever arm and an optical fiber connected thereto, as well as a mount, for example, in the form of a frame, according to an embodiment of the invention.

FIG. 5 shows a further device 200 for detecting acceleration. As compared to the embodiments described above, which are described with reference to FIGS. 1-4, FIG. 5 illustrates two further aspects, features and details, respectively, which can be used independently of one another or in combination with the previous embodiments. For the sake of simplification, the already described aspects, features and details of other embodiments will not be repeated.

As a first modification in contrast to the spring 322, which may be designed as a thin spring metal sheet, for example, FIG. 5 shows a rotary joint or a rotary axle 522 to which the lever arm 206 is attached. The rotary axle 522 forms the fixed point for the movement of the fiber mount 204, the lever arm 206, and the mass 202 in the sensor plane, i.e. the paper plane in FIG. 5. In this case, the use of a rotary joint or a rotary axle may result in an increased rigidity in a plane deviating from the sensor plane. This leads to an improved measurement accuracy.

As a second modification, which can be implemented in addition or as an alternative, a second fiber Bragg grating 506 is provided in the optical fiber 104 apart from the first fiber Bragg grating 106. Upon a movement of the mass 202 or the lever arm 206 and thus the fiber mount, a positive elongation in the area of the fiber Bragg grating 106, as shown, for example, by arrow 108, in return leads to a negative elongation in the fiber Bragg grating 506, as shown, for example by arrow 508. Conversely, a negative elongation in the fiber Bragg grating 106 leads to a positive elongation in the fiber Bragg grating 506. Electromagnetic radiation 14, e.g. primary light, is modified in an embodiment as illustrated in FIG. 5 both at the fiber Bragg grating 106 and the fiber Bragg grating 506. The optical signal resulting therefrom, such as, for example, of the reflected light 15 or also transmitted light forming the optical signal, is hereby provided having a higher information content. This enables a measurement in the wavelength area of the first fiber Bragg grating and the second fiber Bragg grating. This allows the measurement accuracy to be increased in a simple manner.

Figures 6A, 6B:
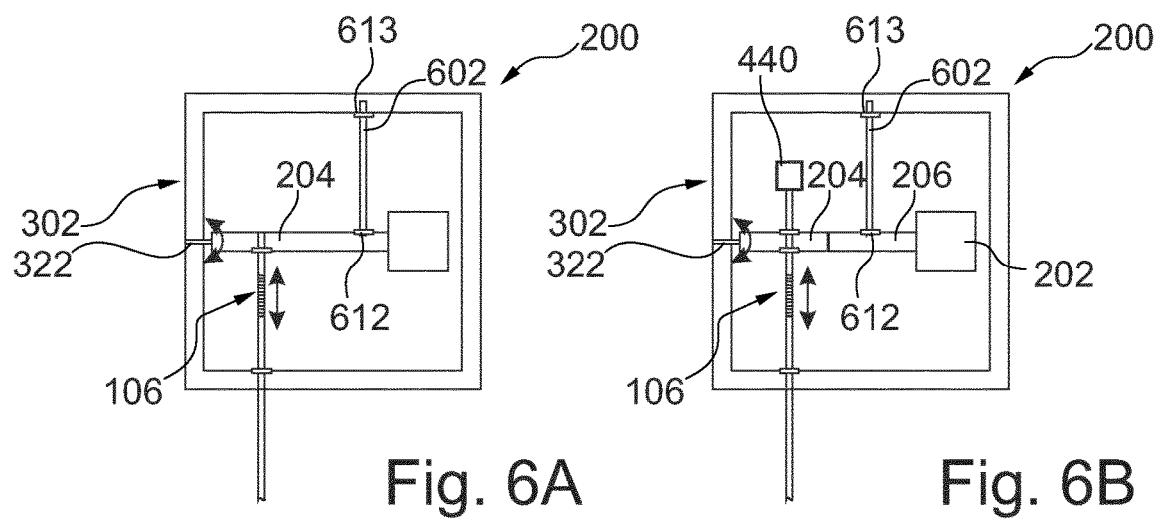
FIGS. 6A and 6B schematic views of further devices for measuring acceleration having a lever arm and an optical fiber connected thereto, as well as a mount, for example, in the form of a frame, according to an embodiment of the invention, wherein a damping element is used, for example for temperature compensation.

FIGS. 6A and 6B show further devices 200 for detecting acceleration. Via the lever arm or a fiber mount, the mass 202 is attached to a spring 322, which forms a fixed rotary point in a sensor plane. Due to the attachment of the optical fiber 104 to the lever arm or a fiber mount, the optical fiber 104 having the fiber Bragg grating 106 leads to an elongation of the fiber in case of a movement of the lever arm or the mass. As already illustrated in FIG. 4, a terminator 440 is likewise provided at the fiber end of the optical fiber 104 in FIG. 6.

FIGS. 6A and 6B moreover show a damping element 602. The damping element 602 may be arranged on a side of the fiber mount or lever arm opposite the optical fiber or fiber Bragg grating. Following an acceleration of the mass 202, the excitation due to this acceleration at a subsequent constant speed leads to a vibration at the natural frequency of the system. This vibration typically decays within a short time. In order to amplify the damping or accelerate the decay, a damping element may be inserted.

According to typical embodiments, which can be combined with other embodiments, the damping element may be provided by an element, for example, a silicone rod. The damping element may be moreover employed for temperature compensation, if it is provided in the form of a rod between the lever arm or the fiber mount and the frame 302. The damping element may be provided between the frame and the movable arrangement of the device 200 at a pretension.

In FIG. 6A, a damping element 602 is provided between a lever arm 204 and an optical fiber 104 attached thereto. The mass 202 is attached to the lever arm 204. The lever arm 204 is attached to the frame 302 via a spring 322 or another element allowing rotation of the mass 202. A damping element 602, for example, in the form of a rod, allows setting of the working point in the production to be ensured. For this purpose, a targeted pretension acting upon the damping element or a pretension acting upon the fiber may be provided. The pretensions of the fiber and/or the damping element can be set. Preferably, the pretension of the damping element can be set. By selecting the material of the rod, for example, silicone or rubber, the temperature sensitivity of the sensor may be reduced to a few pm/K. The damping element 602 in the form of a rod may act as a temperature compensation element.

FIG. 6B illustrates further embodiments in which the damping element 602, for example, a rod, is provided between the lever arm 206 and the frame 302. Alternatively, the damping element 602 may be provided between the fiber mount 204 and the frame 302. In FIG. 6B, the movable arrangement of the device 200 is provided by a fiber mount 204, a lever arm 206 and the mass 202. These are connected to the frame 302 by a spring or another element for determining a rotary axis. Moreover, embodiments according to FIGS. 6A and 6B may have a terminator 440.

Embodiments of the present invention allow a movable arrangement of lever arm 204 and mass 202 or a movable arrangement including a fiber mount 204, a lever arm 206, and a mass 202 to be connected to the frame 302 at merely 3 positions. This attachment reduces tensions acting upon the movable arrangement in the event of temperature fluctuations or movements. The reduction of the tensions by the limitation of the attachment points at the frame increases the service life of the device 200 for measuring acceleration. According to embodiments described herein, the three points, at which the movable arrangement is connected to the frame 302, may be provided by a spring or another rotary axle, by a connection to the optical fiber, and by the damping element in the form of a rod.

Figure 7:
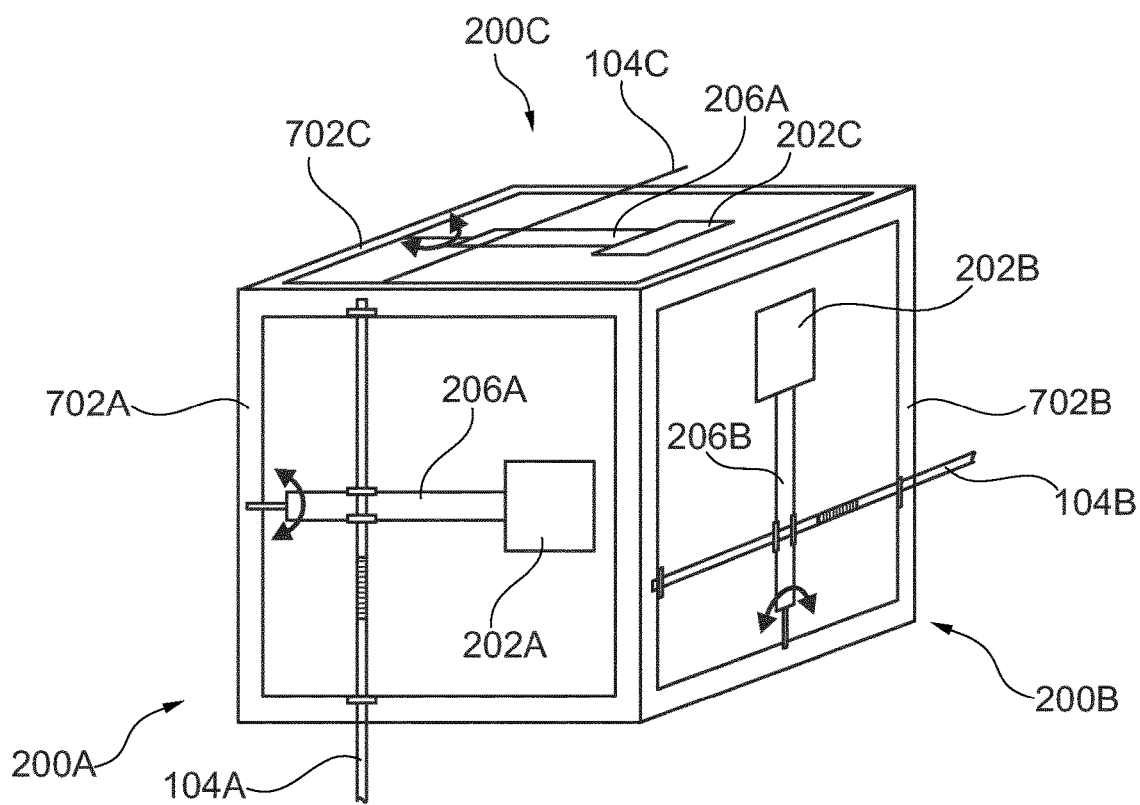
FIG. 7 a schematic view of a device for measuring acceleration in three spatial directions, having in each case a lever arm and and optical fiber connected thereto, according to an embodiment of the invention.

FIG. 7 shows a further device for detecting acceleration, wherein in particular, an acceleration in several spatial directions can be detected. FIG. 7 shows a device for detecting acceleration in all three spatial directions. The device in FIG. 7 shows a first acceleration sensor 200A, a second acceleration sensor 200B, and a third acceleration sensor 200C, each of the acceleration sensors being formed according to one of the embodiments described herein for detecting acceleration. Each of the acceleration sensors includes an optical fiber 104A, 104B, and 104C, respectively, having a corresponding fiber Bragg grating, a mass 202A, 202B, and 202C, respectively, a lever arm 206A, 206B, and 206C, respectively, if need be, a fiber mount (not illustrated in FIG. 7), as well as a frame 702A, 702B, 702C. Due to the realization of the mount 302 as frames, as illustrated in FIGS. 3A-6B, a combination of at least two acceleration sensors or, as illustrated in FIG. 7, three acceleration sensors may be provided in a particularly easy manner. The acceleration sensors described above may therefore be assembled in a particularly easy manner to a multi-dimensional sensor.

Figure 8:
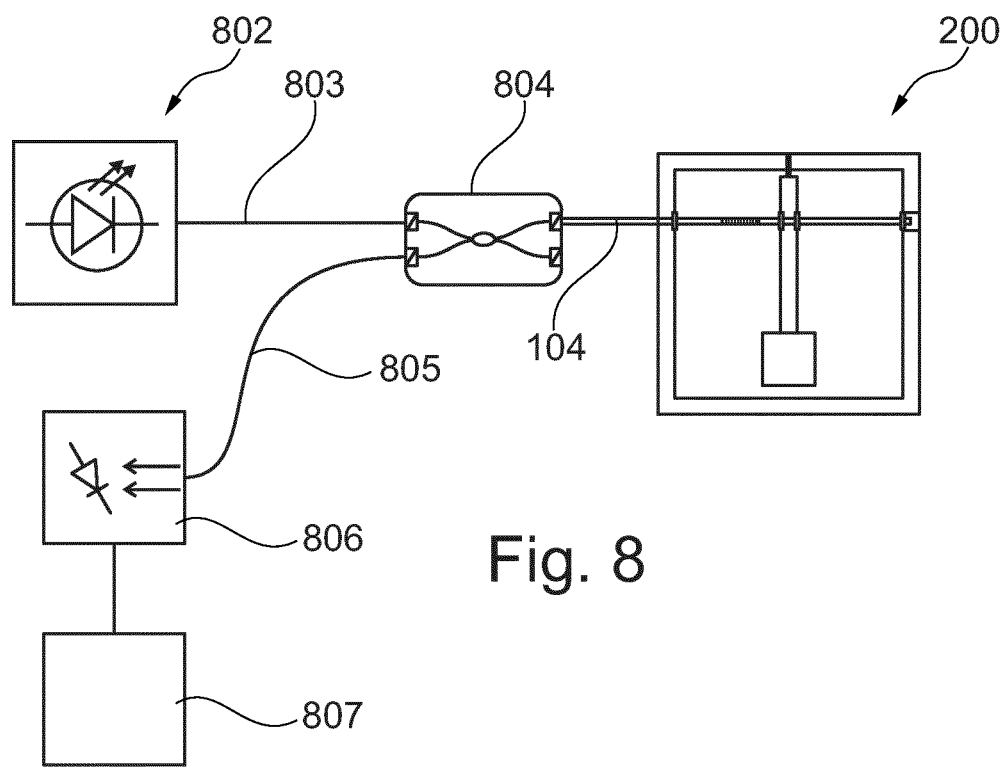
FIG. 8 a schematic view of a measurement arrangement with a device for measuring acceleration having a lever arm and an optical fiber connected thereto according to an embodiment of the invention.

FIG. 8 shows a typical measurement system for detecting acceleration by a device for detecting acceleration according to the embodiments described herein. The system includes one or more devices 200. The system has a source 802 for electromagnetic radiation, for example, a source of primary light. The source serves for providing optical radiation by means of which at least one optical sensor element of a device 200 can be irradiated. For this purpose, an optical transmission fiber 803 is provided between the source 802 of primary light and a first fiber coupler 804. The fiber coupler couples the primary light into the optical fiber 104. The source 802, for example, may be a broadband light source, a laser, an LED (light emitting diode), an SLD (superluminescent diode), an ASE light source (amplified spontaneous emission light source) or a SOA (semiconductor optical amplifier). For embodiments described herein, several source of the same or different type (see above) may be used as well.

The optical sensor element, typically a fiber Bragg grating, is integrated in a sensor fiber 104. The light reflected by the optical sensor elements is in turn guided via the fiber coupler 804, which guides the light via the transmission fiber 805 to a detector 806. In particular, when several FBGs are used as illustrated in FIG. 5, for example, an optical filtering means (not illustrated) may be used in addition for filtering the optical signal or the secondary light. An optical filtering means may comprise an optical filter selected from the group consisting of a thin film filter, a fiber Bragg grating, an LPG, an arrayed waveguide grating (AWG), an echelle grating, a grating arrangement, a prism, an interferometer, and any combination thereof.

The detector or, if required for the application, the detectors, detect the optical signal, i.e. the measurement signal, and supply it to an evaluation unit so as to generate a signal corresponding to the acceleration. Typically, the detector detects an intensity of electromagnetic radiation, wherein an intensity measurement can be conducted exclusively, or alternatively, a spectrally resolved intensity measurement can even be conducted.

Figure 9:
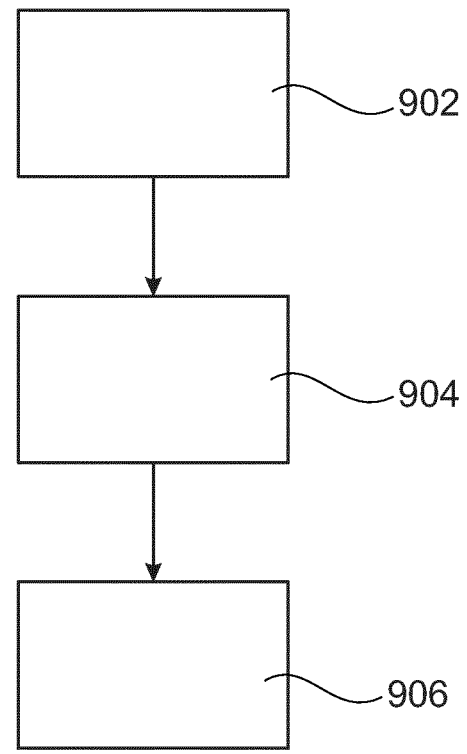
FIG. 9 a flow chart for illustrating a method for detecting acceleration according to embodiments of the present invention.

FIG. 9 shows a flow chart of a measurement method for detecting acceleration according to embodiments described herein. In step 902, electromagnetic radiation is radiated into a device for detecting acceleration according to the embodiments described herein. In step 904, the optical signal, i.e. the secondary light or measurement light, is detected, which is provided by the electromagnetic radiation influenced by the device. In step 906, the optical signal is evaluated in order to obtain a signal corresponding to the acceleration.

Although the present invention is described above on the basis of typical exemplary embodiments, the invention is not restricted thereto but can be modified in various ways. Neither is the invention restricted to the mentioned options of application.

What is claims is:

1. A device for detecting acceleration, comprising:
    a frame;
    a mass;
    a lever arm connected to the mass, wherein the mass is provided at a first lever position;
    an optical fiber having a fiber-optic sensor; and
    a compensation element for disturbance variables, wherein the compensation element for disturbance variables is connected to the lever arm, wherein the compensation element for disturbance variables is connected to the frame, and wherein the compensation element includes a fiber mount provided independently from the lever arm, the optical fiber being connected to said fiber mount.

2. The device according to claim 1, wherein the compensation element is a temperature compensation element.

3. The device according to claim 1, wherein the compensation element is a fiber mount connected to the frame so that the mass is connected to the lever arm, the lever arm is connected to the fiber mount, and the fiber mount is connected to the frame.

4. The device according to claim 3, wherein the lever arm is attached directly or by means of the fiber mount to a fixed point in such a manner that a rotation is performed about a rotary axis.

5. The device according to claim 4, wherein the rotation is performed about a spatially fixed rotary axis.

6. The device according to claim 1, wherein the thermal expansion coefficient of the frame is less than the thermal expansion coefficient of the compensation element for disturbance variables at least by a factor of 1.5.

7. The device according to claim 1, wherein the compensation element further includes a rod.

8. The device according to claim 7, wherein the rod is extends between the fiber mount and the frame.

9. The device according to claim 7, wherein the rod is pretensioned.

10. The device according to claim 7, wherein the rod comprises silicone.

11. The device according to claim 1, wherein the optical fiber is connected to the lever arm or the fiber mount at a second lever position.

12. A system for detecting acceleration in at least two spatial directions, comprising:
at least two devices for detecting acceleration, each device comprising:
a frame;
a mass;
a lever arm connected to the mass, wherein the mass is provided at a first lever position;
an optical fiber having a fiber-optic sensor; and
a compensation element for disturbance variables, wherein the compensation element for disturbance variables is connected to the lever arm, and wherein the compensation element for disturbance variables is connected to the frame, and wherein the compensation element includes a fiber mount provided separately from the lever arm, the optical fiber being connected to said fiber mount,
wherein respective frames of the at least two devices are mutually connected.

13. A method for detecting acceleration, comprising:
irradiating electromagnetic radiation into a device for detecting acceleration, comprising:
a frame;
a mass;
a lever arm connected to the mass, wherein the mass is provided at a first lever position;
an optical fiber having a fiber-optic sensor; and
a compensation element for disturbance variables, wherein the compensation element for disturbance variables is connected to the lever arm, and wherein the compensation element for disturbance variables is connected to the frame, and wherein the compensation element includes a fiber mount provided separately from the lever arm, the optical fiber being connected to said fiber mount;
detecting an optical signal provided by the electromagnetic radiation influenced by the device; and
evaluating the optical signal.

14. A system for detecting acceleration in at least two spatial directions, comprising:
at least three devices for detecting acceleration, each device comprising:
a frame;
a mass;
a lever arm connected to the mass, wherein the mass is provided at a first lever position;
an optical fiber having a fiber-optic sensor; and
a compensation element for disturbance variables, wherein the compensation element for disturbance variables is connected to the lever arm, and wherein the compensation element for disturbance variables is connected to the frame, and wherein the compensation element includes a fiber mount provided separately from the lever arm, the optical fiber being connected to said fiber mount,
wherein the respective frames of the at least two devices are mutually connected.

* * * * *